(12) United States Patent
Nedeltchev

(10) Patent No.: US 9,331,920 B2
(45) Date of Patent: May 3, 2016

(54) MEDIA PATH MONITORING OVER A SECURE NETWORK

(75) Inventor: Plamen Nedeltchev Nedeltchev, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 13/357,689

(22) Filed: Jan. 25, 2012

(65) Prior Publication Data

US 2013/0191628 A1 Jul. 25, 2013

(51) Int. Cl.
*H04L 29/06* (2006.01)
*H04L 12/26* (2006.01)
*H04L 29/08* (2006.01)

(52) U.S. Cl.
CPC ............... *H04L 43/08* (2013.01); *H04L 43/18* (2013.01); *H04L 63/0272* (2013.01); *H04L 69/22* (2013.01); *H04L 69/326* (2013.01); *H04L 63/164* (2013.01); *H04L 69/16* (2013.01)

(58) Field of Classification Search
USPC .................................. 713/150–153, 160–163
See application file for complete search history.

(56) References Cited

U.S. PATENT DOCUMENTS

| 6,765,904 B1 * | 7/2004 | Anandakumar et al. ...... 370/389 |
| 7,496,044 B1 | 2/2009 | Wing |
| 7,706,314 B2 | 4/2010 | Nedeltchev |
| 2004/0264433 A1 * | 12/2004 | Melpignano .................. 370/349 |
| 2006/0262783 A1 * | 11/2006 | Nedeltchev .................... 370/389 |
| 2007/0147378 A1 * | 6/2007 | Elgebaly et al. .............. 370/392 |
| 2011/0087878 A1 | 4/2011 | Weis et al. |
| 2012/0008498 A1 | 1/2012 | Clemm et al. |
| 2012/0016981 A1 | 1/2012 | Clemm et al. |
| 2012/0026877 A1 * | 2/2012 | Rajappan et al. ............. 370/235 |

* cited by examiner

*Primary Examiner* — Joseph P Hirl
*Assistant Examiner* — Chi Nguy
(74) *Attorney, Agent, or Firm* — Edell, Shapiro & Finnan, LLC

(57) ABSTRACT

Techniques are provided for obtaining header information from a packet configured for real-time communications transport over a network. The header information is used to monitor network performance of one or more secure portions of the network. The packet is encrypted using a security protocol and encapsulated using a transport protocol to produce a transport packet for transmission over the network. The transport packet header information is inserted into the transport packet prior to transmission over the network. The header information is used by a downstream network device or network analyzer to determine performance metrics for the network without decrypting the encrypted packet.

20 Claims, 7 Drawing Sheets

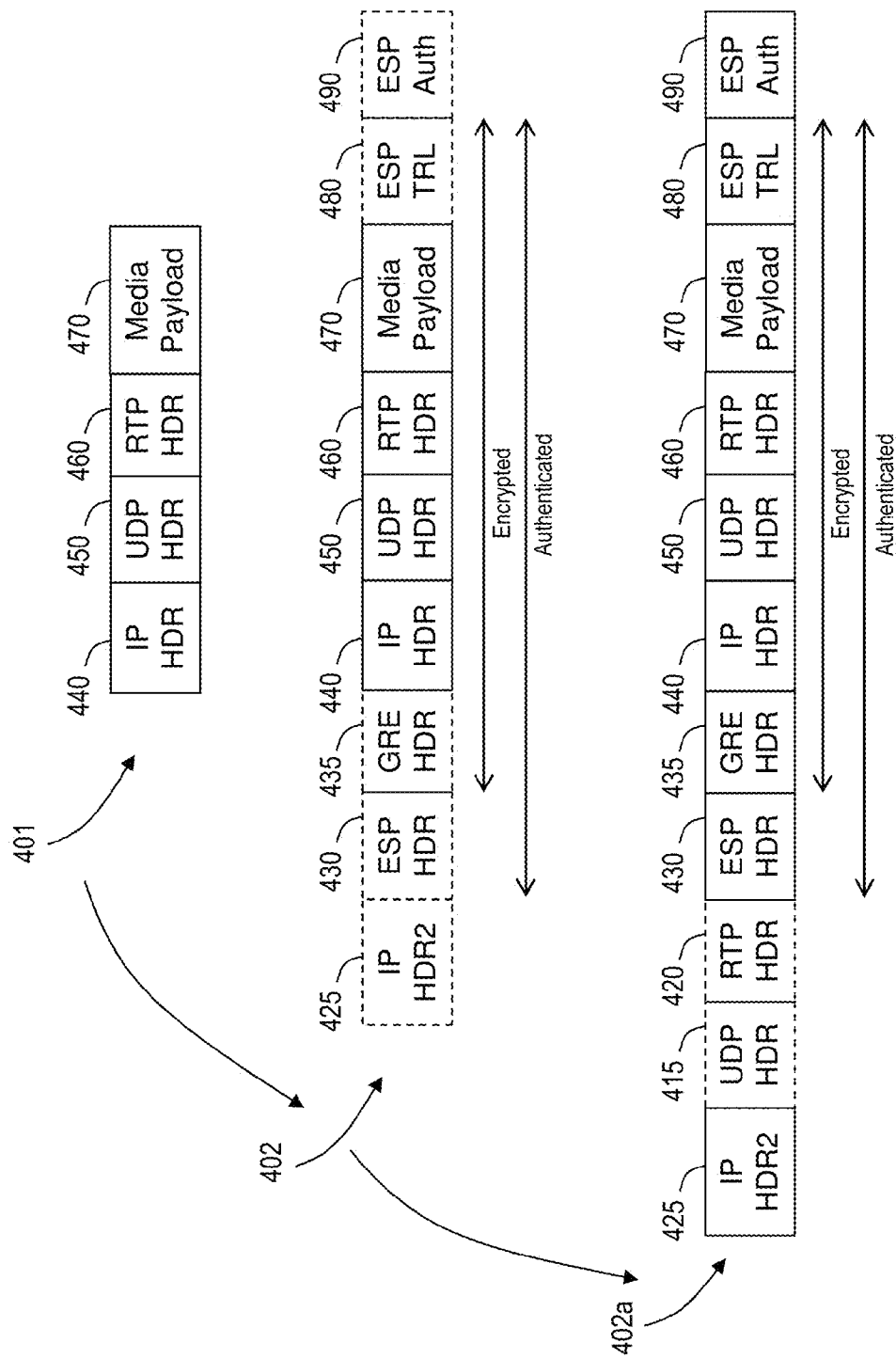

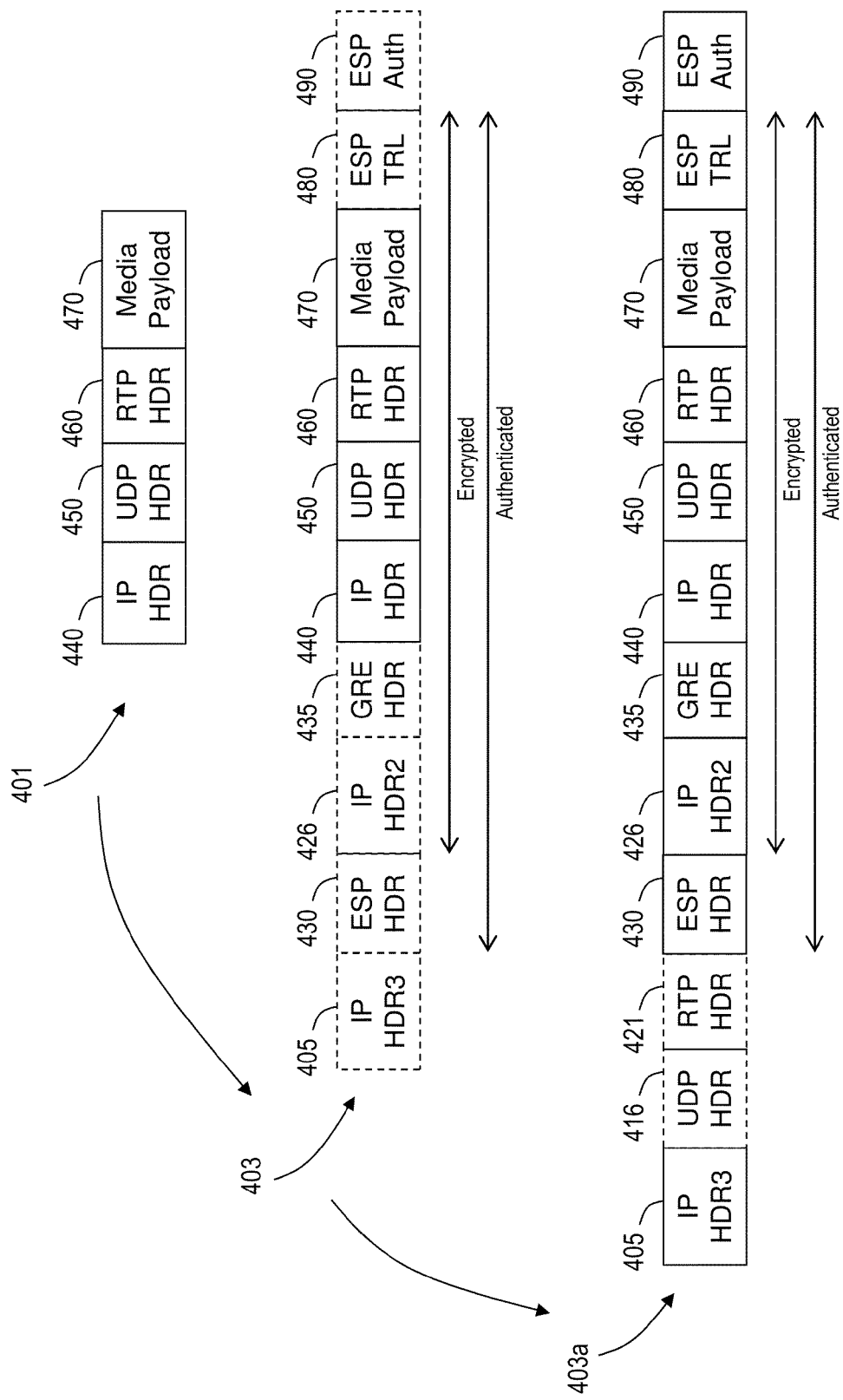

MEDIA PATH MONITORING OVER A SECURE NETWORK

TECHNICAL FIELD

The present disclosure relates generally to network monitoring, and more specifically to monitoring real-time network traffic in a secure or encrypted network.

BACKGROUND

Monitoring of network traffic has become ubiquitous in the field of networking for troubleshooting and to support various applications. Techniques include local traffic monitoring and remote traffic monitoring. Local traffic monitoring involves the use of a network analyzer coupled to a local switch or network device. Packets received or transmitted from a local port are duplicated and also sent to another local port that is coupled to the network analyzer. The network analyzer then analyzes the traffic. In remote traffic monitoring, the duplicated packets are sent over the network to a remote switch that is coupled to the network analyzer. The traffic is analyzed at the remote location.

In networks that transmit voice, time division multiplexing (TDM) networks have been used since the 1960's in telecommunications networks to digitally transmit voice. As such, TDM networks have been developed with a robust suite of tools, e.g., an Operations, Administration, and Management suite, which maintains a level of reliability that telecommunications operators have grown to expect. With the advent of optical networks, telecommunications operators have applied TDM to Synchronous Optical Networking (SONET) and Synchronous Digital Hierarchy (SDH) optical networks.

Over time, the telecommunications industry has experienced increasing economic pressure to integrate different services, e.g., by adding packet based services to TDM services and vice versa. Furthermore, with their availability and low cost, packet based networks are the choice of many organizations to transmit voice and video. However, packet based networks do not have the robust management tools available to TDM networks. Furthermore, the voice and video packets are encrypted since many packets may travel over a public network. Traditional network analysis tools use packet headers for analysis and call route tracing, but these headers are unavailable when the packets are encrypted.

BRIEF DESCRIPTION OF THE DRAWINGS

FIG. 4a is a first example of a diagram of a transport packet configured to carry packet information for encrypted packets.

FIG. 4b is a second example of a diagram of a transport packet configured to carry packet information for encrypted packets.

DESCRIPTION OF EXAMPLE EMBODIMENTS

Overview

Techniques are provided for obtaining header information from a packet configured for transport over a network. The header information is used to monitor network performance over secure networks, e.g., one or more encrypted or secure portions of a network such as encrypted communication links. The packet is encrypted using a security protocol and encapsulated using a transport protocol to produce a transport packet for transmission over the network. The header information is inserted into the transport packet prior to transmission over the network. The header information is used by a downstream network device or network analyzer to determine and expose the performance metrics of the network, without decrypting the encrypted packet.

Techniques are also provided herein for receiving (directly or indirectly through a relay device) the transport packet at a downstream network device or network analyzer. The header information is extracted from the transport packet. The header information is analyzed to performance metrics for the network with respect to the encrypted packet, without decrypting the encrypted packet.

Example Embodiments

Figure 1:
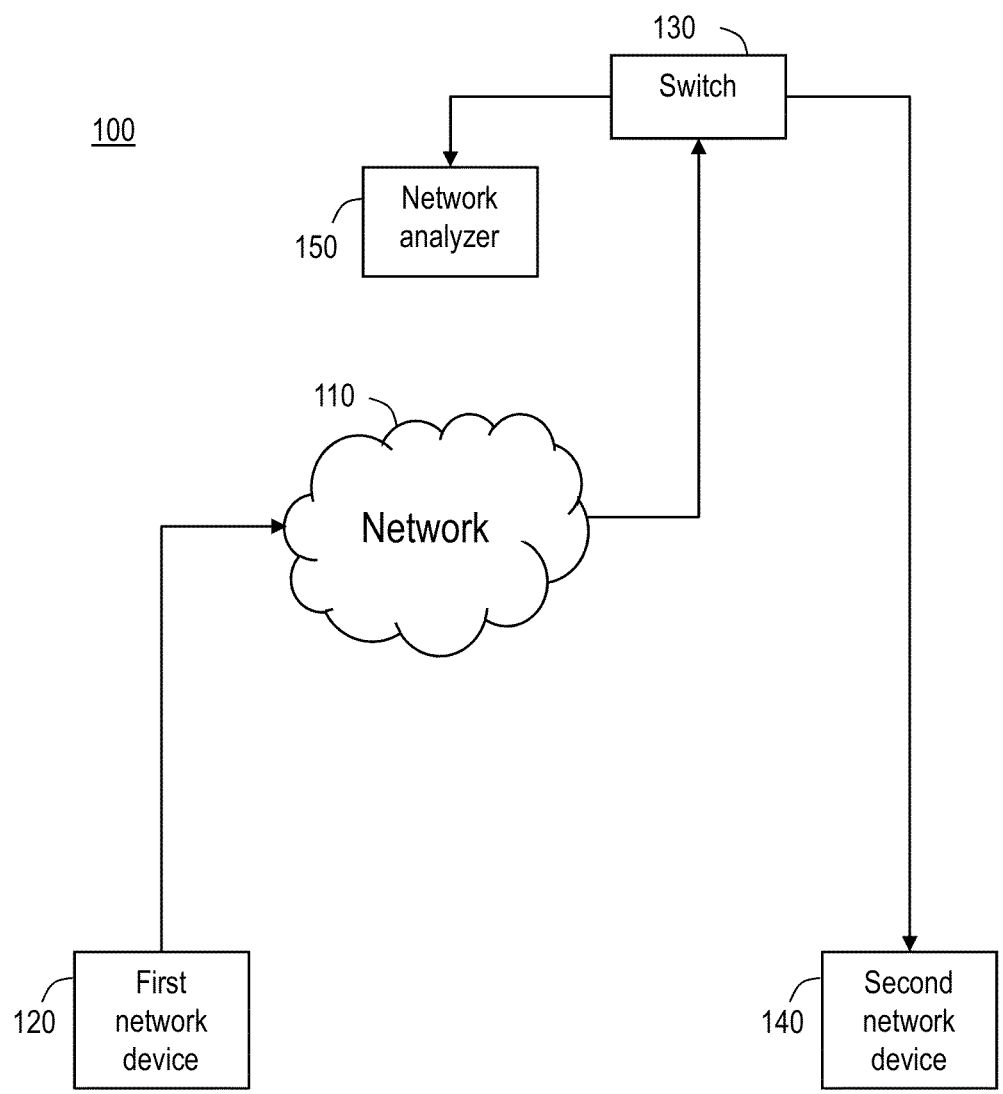
FIG. 1 is a block diagram showing an example of a network with a device configured to insert packet information for network analysis into transport packets that are transporting encrypted packets carrying real-time data, as well as a device to analyze the encrypted packets.

Referring first to FIG. 1, a block diagram is shown that depicts a system 100 comprising a network or backbone 110, a first network device 120, a switch 130, a second network device 140, and a network analyzer 150. Network administrators are interested in monitoring calls, sessions, and individual flows between the first network device 120 and the second network device 140, e.g., for monitoring the quality of time-sensitive applications like Voice over Internet Protocol (VoIP) and video over IP calls. When a single multimedia call represents several individual flows (video, voice, data), network administrators are interested in monitoring every single flow inbound and outbound with regard to the originating devices, e.g., network devices 120, 130 or 140. Although only several network devices are shown, any number of switches, routers, and other wired or wireless network devices may be included in the system 100 and monitored using the techniques described herein.

The first network device 120 is configured to obtain packet header information from an original unencrypted packet, encrypt the packet, encapsulate the packet for forwarding, and insert the unencrypted packet header information into an unencrypted portion of the encapsulated packet. In this way, any device along the path from the first network device 120 to the second network device 140 may "peek" at or otherwise examine the original packet header information without having to decrypt the original packet. Information about the original packet may be used to determine network performance metrics. As used herein, network performance metrics refer to latency, jitter, dropped packets, route tracing, or metrics as provided in Listing 1 below. It is to be understood that other metrics may be used. Each device along the path may generate performance metrics and report them to a designated network device, e.g., a collector or network analyzer 150 for further analysis.

The switch 130 or other downstream devices may forward performance metrics for packets received for communications from the first network device 120 to the second network device 140, e.g., the metrics may be forwarded to the network analyzer 150 or other data collector type device. The devices in a unidirectional path may be referred to herein as "downstream" devices by virtue of their relationship with the communication path. For example, with respect to unidirectional traffic going from device 120 to device 140, all devices in the network path from device 120 are downstream with respect to device 120.

The techniques described herein are useful in a variety of contexts, e.g., secure or encrypted networks such as virtual private networks (VPNs). VPNs provide a lower cost and highly flexible alternative to replacing or augmenting dedicated private networks that use leased lines, Frame Relay, or Asynchronous Transfer Mode (ATM) circuits. VPNs also provide seamless remote access for telecommuters and mobile workers, as well as cost-effective remote-office connectivity, e.g., voice and video access to their data network. In many cases, the data will traverse portions of a public network. Accordingly, packets transmitted over a VPN are encrypted to ensure privacy and network security. However, encryption has a drawback in that it hampers network monitoring.

Existing methods of monitoring network performance are based on variety of tools that are largely based on protocols like ICMP Traceroute, Multi-Protocol Label Switching (MPLS) Operations, Administration, and Maintenance (OAM), Ethernet-OAM, or Link Layer Discovery Protocol (LLDP), to name a few. In conventional networks that use ITU-T Recommendation Q.931 for Integrated Services Digital Network (ISDN) connection control signaling, it is possible to trace a call end-to-end and determine the quality of the call, and some cases the quality of voice calls.

With the transition from TDM or ISDN/T1/Primary Rate Interface (PRI) networks to VoIP for voice and video in Internet Service Provider (ISP) networks, the ability to trace or monitor calls in real-time has diminished, e.g., Call Detail Records are difficult to obtain. Signaling protocols like Session Initiation Protocol (SIP) and Skinny Call Control Protocol (SCCP) do not provide tool sets to trace and monitor the real-time calls and/or to assess the quality of the call and voice, video and data flows by way of IP Service Level Agreement (SLA) parameters such as jitter, packet drops, and latency.

To aid in network monitoring, tools such as MediaNet and MediaTrace, developed by Cisco Systems, Inc., were one of the first network services to enable the real-time monitoring of time sensitive applications such as voice and video. To allow some of these protocols to provide the monitoring and management information for the entire path, every node has to be capable of responding to a management request from the originator. This is a challenge in public networks, which may not be MediaNet or MediaTrace capable. Furthermore, even if a network node is MediaNet enabled, the node may not be able to report network IP SLAs. This is true because the traffic is being sent over a VPN connection that is encrypted, and this makes the call or media flow "invisible" for the intermediate nodes. Thus, tools like MediaNet cannot expose and monitor media calls and errors end-to-end, thereby limiting the tools use to enterprise domains only.

Figure 2:
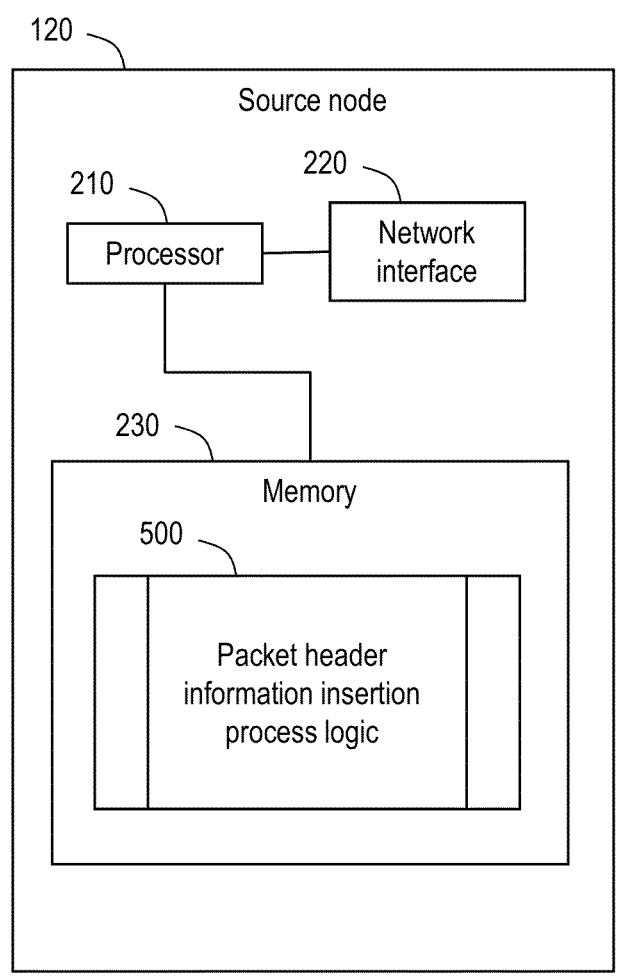
FIG. 2 is an example block diagram of a source device that is configured to insert packet information for network analysis into transport packets that are transporting encrypted packets.

Referring to FIG. 2, an example block diagram of a network device, e.g., a packet source node or first network device 120 is shown that is configured to perform or execute a packet header information insertion process logic 500. Device 120 comprises a processor 210, a network interface unit 220, and a memory 230. The network interface unit 220 enables communication between the device 120 and other network elements in the system 100, such as by way of wired, wireless, or optical interfaces to the network 100 (FIG. 1). The memory 230 stores instructions for the packet header information insertion process logic 500. The processor 210, when it executes instructions for the packet header information insertion process logic 500, obtains packet header information from an original unencrypted packet, encrypts the packet, encapsulates the packet for forwarding, and inserts the unencrypted packet header information into an unencrypted portion of the encapsulated packet. The details of process logic 500 will be described in connection with FIGS. 4a, 4b, and 5.

The processor 210 is a data processing device, e.g., a microprocessor, microcontroller, systems on a chip (SOCs), or other fixed or programmable logic. The processor 210 interfaces with the memory 230 that may be any form of random access memory (RAM) or other data storage or memory block that stores data used for the techniques described herein and the instructions for the packet header information insertion process logic 500. The memory 230 may be separate or part of the processor 210. Instructions for performing the packet header information insertion process logic 500 may be stored in the memory 230 for execution by the processor 210.

Memory 230 may comprise read only memory (ROM), random access memory (RAM), magnetic disk storage media devices, optical storage media devices, flash memory devices, electrical, optical, or other physical/tangible (non-transitory) memory storage devices.

The functions of the processor 210 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, the process logic 500 may be implemented with fixed logic or programmable logic (e.g., software/computer instructions executed by a processor or field programmable gate array (FPGA)), or the processor readable tangible medium may be encoded with instructions that, when executed by a processor (e.g., processor 210), cause the processor to execute the process logic 500.

Figure 3:
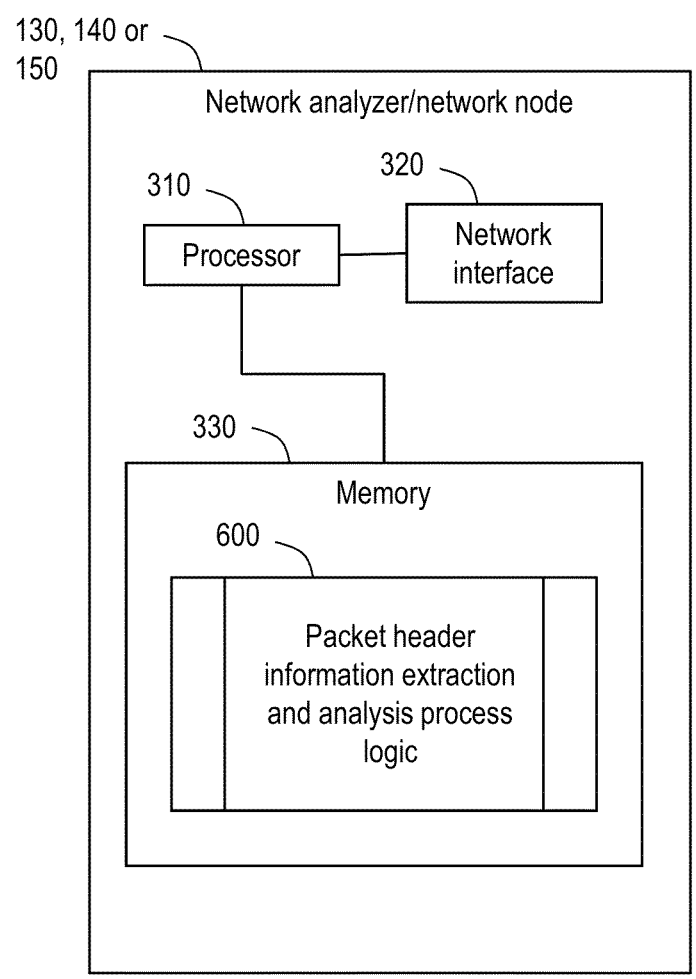
FIG. 3 is an example block diagram of a network device that is configured to extract packet information from transport packets and perform an analysis function using the extracted information.

Referring to FIG. 3, an example block diagram of relevant portions of a second network device, e.g., the second network device 140, network analyzer 150, switch 130, or other intermediate device, is shown. This device comprises a processor 310, a network interface unit 320, and a memory 330. The processor 310, the network interface unit 320, and memory 330 may be configured to operate as described in connection with FIG. 2 for the first network device 120. Other switch components are not shown for simplicity. The device shown in FIG. 3 is configured to perform network analysis by executing packet header information extraction and analysis process logic 600. The memory 330 stores instructions for the packet header information extraction and analysis process logic 600. The packet header information extraction and analysis process logic 600 extracts header information from received transport packets and analyzes the header information to determine network performance metrics as required. The details of process logic 600 will be described in connection with FIG. 6.

Turning now to FIG. 4a, an example diagram of a series of packets is illustrated for generating Generic Routing Encapsulation (GRE) inside Internet Protocol Security (IPsec)

packets according to the techniques described herein. In this example, an IP packet 401 is shown. IP packet 401 comprises an IP header (HDR) 440, a Universal Datagram Protocol (UDP) header 450, a Real-Time Protocol (RTP) header, and a media payload 470. The IP packet 401 may be generated at a network device or received from another network device for encryption and forwarding. The UDP header 450 and the RTP header 460 are obtained from IP packet 401 and reserved for later use as described hereinafter.

The IP packet 401 is encapsulated using a security protocol such as IPsec and a transport protocol to obtain transport packet 402. The newly added encapsulation information is indicated by dashed boxes. Transport packet 402 contains a GRE header 435, an Encapsulating Security Protocol (ESP) header 430 and trailer (TRL) 480, a second IP header (HDR2) 425, and an ESP authentication field 490. As viewed in FIG. 4*a*, the encrypted portion of transport packet 402 runs from the GRE header 435 to the ESP trailer 480. The ESP header 430 serves to authenticate the packet, and IP header2 425 comprises transport or forwarding information. The reserved header information from UDP header 450 and the RTP header 460 are inserted at 415 and 420 into transport packet 402 to obtain transport packet 402*a*. UDP header 415 and UDP header 420 can be used by network devices along the network path to generate network performance metrics, and if configured, forward the metrics to a central location, e.g., network analyzer 150 or the first network device 120 (FIG. 1).

Turning now to FIG. 4*b*, an example diagram of a series of packets is illustrated for generating GRE inside IPsec packets in tunnel mode according to the techniques described herein. In this example, IP packet 401 is shown as in FIG. 4*a*. The UDP header 450 and the RTP header 460 are obtained from IP packet 401 and reserved as described above.

The IP packet 401 is encapsulated using a security protocol such as IPsec and a transport protocol to obtain transport packet 403. The newly added encapsulation information is indicated by dashed boxes. Transport packet 403 contains a GRE header 435, a second IP header (HDR2) 426, an ESP header 430 and trailer (TRL) 480, an ESP authentication field 490, as well as a third IP header (HDR3) 405. As shown in FIG. 4*b*, the encrypted portion of transport packet 403 runs from the IP header2 426 to the ESP trailer 480, the ESP header 430 serves to authenticate the packet, and IP header2 425 comprises transport or forwarding information for use after tunneling. IP header3 405 is used for tunneling through the network as is known in the art.

The reserved header information from UDP header 450 and the RTP header 460 are inserted at 416 and 421 into transport packet 403 to obtain transport packet 403*a*. UDP header 416 and UDP header 421 can be used by network devices along the network path to generate network performance metrics, and if configured, forward the metrics to a central location. The inserted header information, e.g., UDP header 415, UDP header 420, UDP header 416, and UDP header 421 from FIGS. 4*a* and 4*b*, does not have the same reference numerals as the corresponding headers in the unencrypted IP packet, i.e., UDP header 450, RTP header 460. The reference numerals are different because some of the header information in the inserted headers may be modified by changing, adding, or removing information.

Accordingly, a relatively simple scheme is provided that uses a Dynamic Multipoint VPN (DMVPN) packet format change. The format change is just enough to enable the nodes on the network path, e.g., a VPN link path, to examine content of the encrypted packet and report network flow quality parameters such as throughput (rate), jitter, and packet drops, as their configuration provides. The inserted header information allows every network hop in the VPN link path to examine the UDP/RTP packet header information.

The IPsec encapsulation is achieved in a way that the voice/video packet "looks like" regular (not encrypted) voice/video traffic from point of view of a public network hop, which is on the path of VPN traffic. The example packets shown in FIGS. 4*a* and 4*b* show one possible solution for encapsulation based on Dynamic Multipoint VPN (DMVPN). The DMVPN packets remain intact while the encryption and data authentication mechanisms work as designed. There is no security or performance impact on the intermediate nodes, since there is no synthetic traffic injected into the network. One possible example of network performance metrics output from every hop is shown in Listing 1, below:

---

Match: ipv4 source address = N/A, ipv4 destination address = 10.20.180.68, transport source-port = 18142, transport destination-port = 22292, transport rtp ssrc = 387323843, ip protocol = 17,

| | |
|---|---|
| routing forwarding-status | Forward |
| transport packets expected counter | 15001 |
| transport packets lost counter | 0 |
| transport packets lost rate (%) | 1.00 |
| transport event packet-loss counter | 0 |
| transport rtp jitter mean (usec) | 181 |
| transport rtp jitter minimum (usec) | 0 |
| transport rtp jitter maximum (usec) | 8339 |
| interface input | Tu0 |
| interface output | Vl1 |
| counter bytes | 3000200 |
| counter packets | 15001 |
| counter bytes rate | 10000 |
| application media bytes counter | 2700180 |
| application media bytes rate | 9000 |
| application media packets counter | 15001 |
| application media packets rate | 50 |
| application media event | Normal |

---

Listing 1—Network Performance Metrics

The techniques described herein expand the scope of network monitoring tools, such as MediaNet and MediaTrace, beyond the boundaries of enterprise networks, and provide end-to-end monitoring capabilities over VPN networks. The techniques described herein may be enabled by a simple command line entry on an interface to the network appliance. For example, the command "rtp pre-map" may be entered into the secure tunnel, or cryptographic (crypto) profile, or crypto map of the device configuration. To illustrate one example, a "show run . . . " command entered on a device command line will list the tunnel configuration with rtp pre-map enabled, e.g., as shown in Listing 2 below:

--- interface Tunnel0
    description Provisioned by the network security manager
    bandwidth 2000
    ip address 10.27.150.206 255.255.192.0
    no ip redirects
    ip mtu 1400
    rtp pre-map

---

Listing 2

Figure 5:
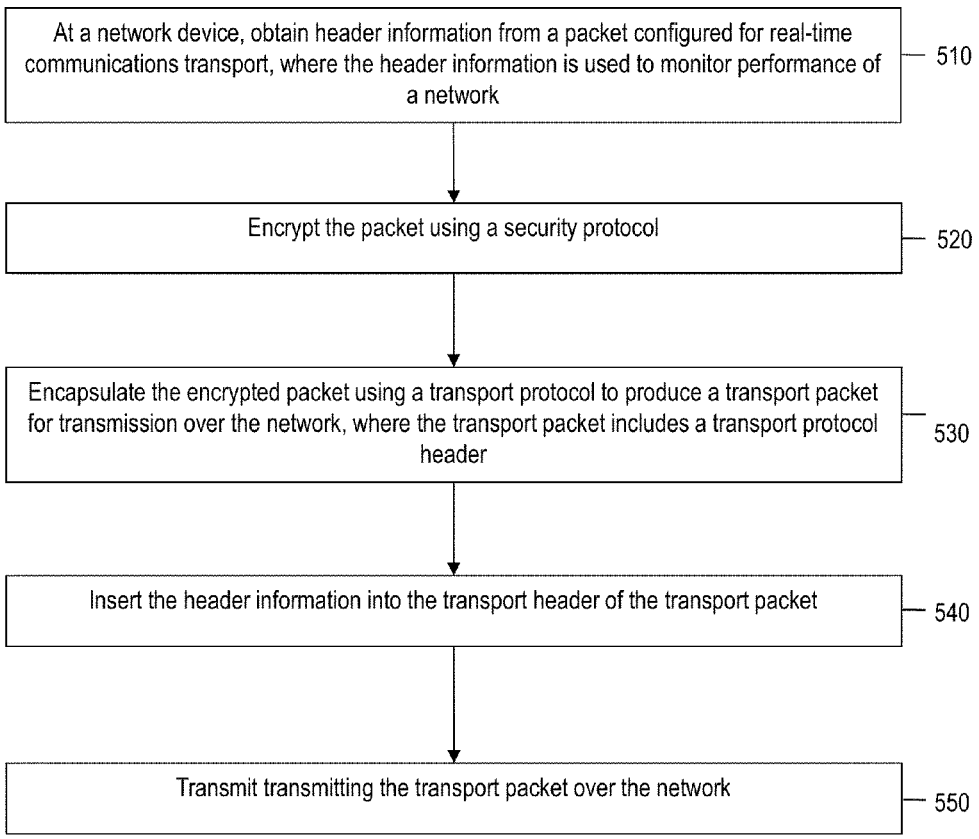
FIG. 5 is an example of a flowchart generally depicting a process for inserting packet information for network analysis into packets that are transporting encrypted packets.

Turning now to FIG. 5 and also with reference to FIG. 1, a flowchart generally depicting the process logic 500 for packet header information insertion will now be described. At 510, at a network device, e.g., network device 120, header information is obtained from a packet configured for transport over a network. It should be noted that the network device need not be the packet source, but may be an edge device that interfaces with the unsecure portion of the network. The header information is used to monitor one or more secure portions of the network, e.g., mixed public and private networks, or secure network links. At 520, the packet is encrypted using a security protocol. At 530, the packet is encapsulated using a transport protocol to produce a transport packet for transmission over the network. At 540, the header information is inserted into the transport packet. It is important to note that it is possible for some of the header information to be modified by changing, adding, or removing information. For example, some information may not be needed for monitoring network performance or the network operator may not want certain information exposed to others. At 550, the transport packet is transmitted over the network.

The transport packet may be further encapsulated using a tunneling protocol to produce a tunnel packet for tunneling over the network, where the tunnel packet has a tunnel protocol header. The header information may be inserted between the tunnel protocol header and the transport protocol header.

Figure 6:
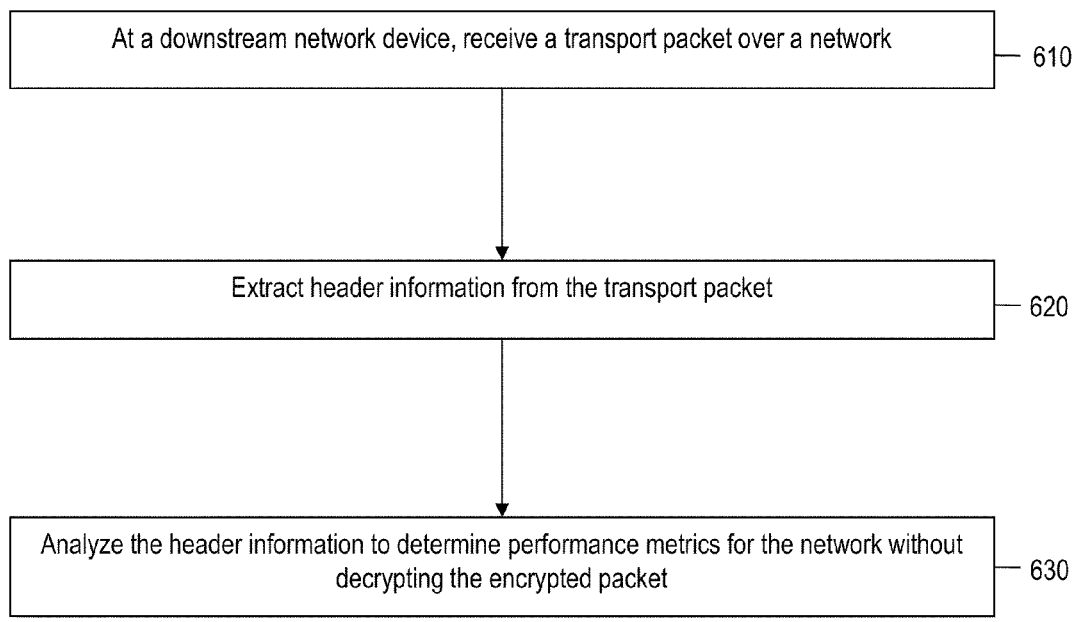
FIG. 6 is an example of a flowchart generally depicting a process for extracting packet information from transport packets and analyzing the extracted information.

Referring to FIG. 6 and also with reference to FIG. 1, a flowchart is shown that generally depicts the process for analyzing header information using the packet header information extraction and analysis process logic 600 used by network devices in system 100, e.g., network analyzer 150. At 610, a transport packet is received at a downstream network device. The transport packet includes an unencrypted header and an encrypted packet, where the unencrypted header contains header information for the encrypted packet. For example, the transport packet is received by network analyzer 150, switch 130, network device 140, or other devices in network 110. At 620, the header information is extracted from the transport packet. At 630, the header information is analyzed to determine performance metrics for the network without decrypting the encrypted packet.

Further techniques include forwarding the performance metrics to another device, e.g., network analyzer 150, for further analysis. The network may be a secure network or VPN where downstream network devices perform network analysis on the packet without decrypting the encrypted packet such that those downstream network devices do not have to be fully provisioned with conventional network analysis tools.

In sum, techniques are provided for obtaining header information from a packet configured for transport over a network, e.g., a secure or encrypted network such as a VPN. The header information is used to monitor network performance of one or more secure portions of the network. The packet is encrypted using a security protocol and encapsulated using a transport protocol to produce a transport packet for transmission over the network. The transport packet has a transport protocol header and the header information is inserted into the transport packet prior to transmission over the network. The header information is used by a downstream network device or network analyzer to determine performance metrics for the network without decrypting the encrypted packet.

Techniques are also provided for receiving (directly or indirectly through a relay device) the transport packet at a downstream network device or network analyzer. The header information is extracted from the transport packet. The header information is analyzed to performance metrics for the network without decrypting the encrypted packet.

These techniques expand network monitoring capabilities beyond enterprise networks to secure or encrypted networks such as VPN networks. Real-time performance monitoring is obtained for VPN links. The performance monitoring data are sufficient enough match the monitoring performance obtained over non-encrypted networks. This enables end-to-end monitoring specifically over secured networks, e.g., Secure Sockets Layer (SSL), IPsec, DMVPN, GET VPN, Layer 2 VPN, and generally over any encrypted link. These types of secured networks are typically employed in a large number of industry implementations such as home networks, small and medium business (SMV) networks, small office and remote office over broadband networks, and so on. The packets remain intact and encryption and data authentication work as designed. There is no security or performance impact on the intermediate nodes, since there is no additional traffic generated and sent over the network.

The above description is intended by way of example only.

What is claimed is:

1. A method comprising:
    at a network device in a network configured to forward packets, obtaining header information from a packet, wherein the header information comprises a universal datagram protocol (UDP) header and a real-time protocol (RTP) header of the packet, and wherein the header information is used to monitor network performance of one or more secure portions of the network;
    encrypting the packet using a security protocol resulting in an encrypted packet;
    encapsulating the encrypted packet using a transport protocol to produce a transport packet for transmission over the network, wherein the transport packet has an unencrypted transport protocol header;
    modifying the header information, prior to inserting the header information into the transport packet, such that modified header information includes only information required to monitor the network performance in a modified UDP header and a modified RTP header;
    inserting after an internet protocol (IP) header of the unencrypted transport protocol header the modified header information into the transport packet prior to transmission over the network, wherein the modified UDP header is disposed adjacent to the IP header and the modified RTP header;
    transmitting the transport packet over a secure portion of the network;
    at a downstream network device, examining the modified UDP header and the modified RTP header of the transport packet; and
    analyzing the modified UDP header and the modified RTP header to determine network performance metrics without decrypting the encrypted packet.

2. The method of claim 1, further comprising performing a dynamic multipoint virtual private network (DMVPN) packet format change by encapsulating the transport packet using a tunneling protocol to produce a tunnel packet for tunneling over the network, wherein the tunnel packet has a tunnel protocol header.

3. The method of claim 2, wherein inserting comprises inserting the modified header information between the tunnel protocol header and the transport protocol header.

4. The method of claim 3, further comprising:
    receiving the tunnel packet at a downstream network device;
    extracting the header information from the tunnel packet; and
    analyzing the header information to determine metrics for the network.

5. The method of claim 1, further comprising:
    forwarding performance metrics for the network obtained from the modified header information.

6. The method of claim 1, wherein the network comprises a virtual private network and network devices that perform network analysis on the packet without decrypting the encrypted packet, and wherein the packet is configured for real-time media transport over the virtual private network.

7. A method comprising:
receiving at a downstream network device in a network a transport packet sent from an upstream network device, the transport packet comprising an unencrypted header and an encrypted packet, wherein the unencrypted header contains header information for the encrypted packet, wherein the header information is inserted after an internet protocol (IP) header and comprises a modified universal datagram protocol (UDP) header and a modified real-time protocol (RTP) header modified from an original UDP header and an original RTP header of the encrypted packet, and wherein the modified UDP header is disposed adjacent to the IP header and the modified RTP header;
extracting the modified UDP header and the modified RTP header from the unencrypted header; and
analyzing the modified UDP header and the modified RTP header to determine performance metrics for the network without decrypting the encrypted packet,
wherein the header information is modified, prior to inserting the header information into the transport packet, such that the modified UDP header and the modified RTP header include only information required to monitor the network performance.

8. The method of claim 7, further comprising forwarding to a network analysis device one of the modified header information and the performance metrics.

9. The method of claim 7, wherein the network comprises a virtual private network and network devices that perform network analysis on the transport packet without decrypting the encrypted packet, and wherein the transport packet is configured for real-time media transport over the virtual private network.

10. The method of claim 7, wherein the transport packet is a tunnel packet for tunneling over the network and generated using a dynamic multipoint virtual private network (DM-VPN) packet format change by encapsulating the transport packet using a tunneling protocol, wherein the tunnel packet has a tunnel protocol header.

11. A system, comprising:
an apparatus comprising:
a network interface unit configured to receive packets in a network and transmit packets over the network; and
a processor configured to be coupled to the network interface unit and configured to:
obtain header information from a packet configured for network transport, wherein the header information comprises a universal datagram protocol (UDP) header and a real-time protocol (RTP) header of the packet, and wherein the header information is used to monitor network performance of one or more secure portions of the network;
encrypt the packet using a security protocol resulting in an encrypted packet;
encapsulate the encrypted packet using a transport protocol to produce a transport packet for transmission over the network, wherein the transport packet includes an unencrypted transport protocol header;
modify the header information, before the processor inserts the header information into the transport packet, such that modified header information includes only information required to monitor the network performance in a modified UDP header and a modified RTP header; and
insert after an internet protocol (IP) header of the unencrypted transport protocol header the modified header information into the transport protocol header of the transport packet, wherein the modified UDP header is disposed adjacent to the IP header and the modified RTP header; and transmit the transport packet via the network interface unit over the network; and
a downstream network device configured to:
receive the transport packet;
examine the modified UDP header and the modified RTP header of the transport packet; and
analyze the modified UDP header and the modified RTP header to determine performance metrics for the network without decrypting the encrypted packet.

12. The system of claim 11, wherein the processor is further configured to perform a dynamic multipoint virtual private network (DMVPN) packet format change by encapsulating the transport packet using a tunneling protocol to produce a tunnel packet for tunneling over the network, wherein the tunnel packet includes a tunnel protocol header.

13. The system of claim 11, wherein the processor is configured to insert the modified header information between the tunnel protocol header and the transport protocol header.

14. The system of claim 11, wherein the downstream network device is further configured to forward to a network analysis device one of the modified header information and the performance metrics.

15. The system of claim 11, wherein the network comprises a virtual private network and network devices that perform network analysis on the transport packet without decrypting the encrypted packet, and wherein the transport packet is configured for real-time media transport over the virtual private network.

16. A non-transitory computer readable medium storing instructions that, when executed by a processor, cause the processor to:
obtain header information from a packet configured for network transport, wherein the header information comprises a universal datagram protocol (UDP) header and a real-time protocol (RTP) header of the packet, and wherein the header information is used to monitor network performance of one or more secure portions of a network;
encrypt the packet using a security protocol resulting in an encrypted packet;
encapsulate the encrypted packet using a transport protocol to produce a transport packet for transmission over the network, wherein the transport packet includes an unencrypted transport protocol header;
modify the header information, before the processor inserts the header information into the transport packet, such that modified header information includes only information required to monitor the network performance in a modified UDP header and a modified RTP header;
insert after an internet protocol (IP) header of the unencrypted transport protocol header the modified header information into the transport protocol header of the transport packet, wherein the modified UDP header is disposed adjacent to the IP header and the modified RTP header; and
transmit the transport packet over a secure portion of the network, wherein the modified UDP header and the modified RTP header of the transport packet are examined at a downstream network device and analyzed to determine network performance metrics without the encrypted packet being decrypted.

17. The non-transitory computer readable medium of claim 16, further comprising instructions that, when executed by the processor, cause the processor to perform a dynamic multi-point virtual private network (DMVPN) packet format change by encapsulating the transport packet using a tunneling protocol to produce a tunnel packet for tunneling over the network, wherein the tunnel packet includes a tunnel protocol header.

18. The non-transitory computer readable medium of claim 17, wherein the instructions that insert comprise instructions to insert the modified header information between the tunnel protocol header and the transport protocol header.

19. The non-transitory computer readable medium of claim 16, wherein the network comprises a virtual private network and network devices that perform network analysis on the transport packet without decrypting the encrypted packet, and wherein the transport packet is configured for real-time media transport over the virtual private network.

20. The non-transitory computer readable medium of claim 16, wherein the downstream network device is configured to forward to a network analysis device one of the modified header information and the performance metrics.

\* \* \* \* \*